Mar. 13, 1923.

H. J. VAN DER BIJL

DIRECT CURRENT TRANSFORMER

Filed May 8, 1916

1,448,583

Inventor:
Hendrik J. van der Bijl.
by J.G. Roberts
Att'y.

Patented Mar. 13, 1923.

1,448,583

UNITED STATES PATENT OFFICE.

HENDRIK J. VAN DER BIJL, OF NEW YORK, N. Y., ASSIGNOR TO WESTERN ELECTRIC COMPANY, INCORPORATED, OF NEW YORK, N. Y., A CORPORATION OF NEW YORK.

DIRECT-CURRENT TRANSFORMER.

Application filed May 8, 1916. Serial No. 96,129.

*To all whom it may concern:*

Be it known that I, HENDRIK J. VAN DER BIJL, a subject of the King of Great Britain, residing at New York, in the county of New York and State of New York, have invented certain new and useful Improvements in Direct-Current Transformers, of which the following is a full, clear, concise, and exact description.

This invention relates to a transformer of electric power, and in particular to a transformer whereby a direct current of low voltage is transformed or stepped up to a higher direct current voltage.

A feature of this invention is an arrangement for stepping up direct current of a given voltage to direct current of a substantially constant and much higher voltage.

In this invention, use is made of a rectifier or rectifiers through which an electric current can pass in one direction only, and while any good rectifier may be used, such as the electrolytic, the mercury arc rectifier, etc., I prefer to use, and show in this patent, a thermionic rectifier, that is, one in which a hot electrode, as a source of ions, is used in combination with a cold electrode, the two being placed preferably within an evacuated tube. A direct current source of low voltage is connected to the primary of a step-up transformer and an interrupter. If so desired, any of the usual forms of induction coils, which have interrupters associated with them, may be used. The high voltage obtained in the secondary is then impressed on a rectifier and allowed to charge a condenser. The condenser may thus be charged to a voltage equal to the maximum or peak voltage developed by the transformer and may be used as a high voltage source to supply direct current to a consumption circuit or load. By using a suitable induction coil, or transformer with interrupter, it is possible to transform or step-up a direct current of low voltage to any desired voltage.

Figure 1:
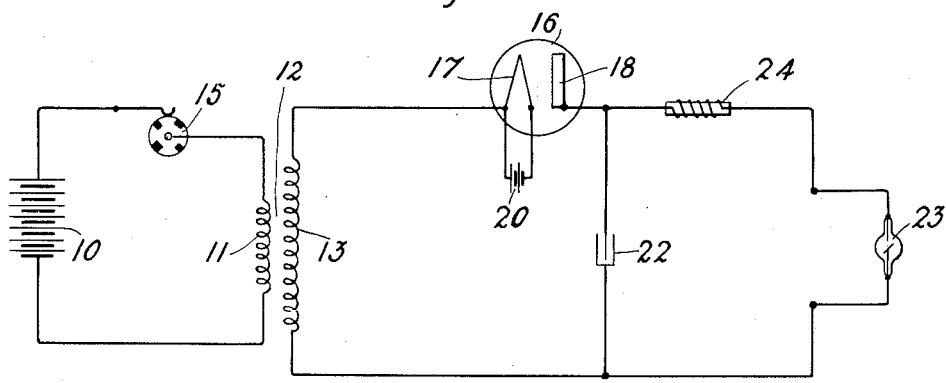
Figure 2:
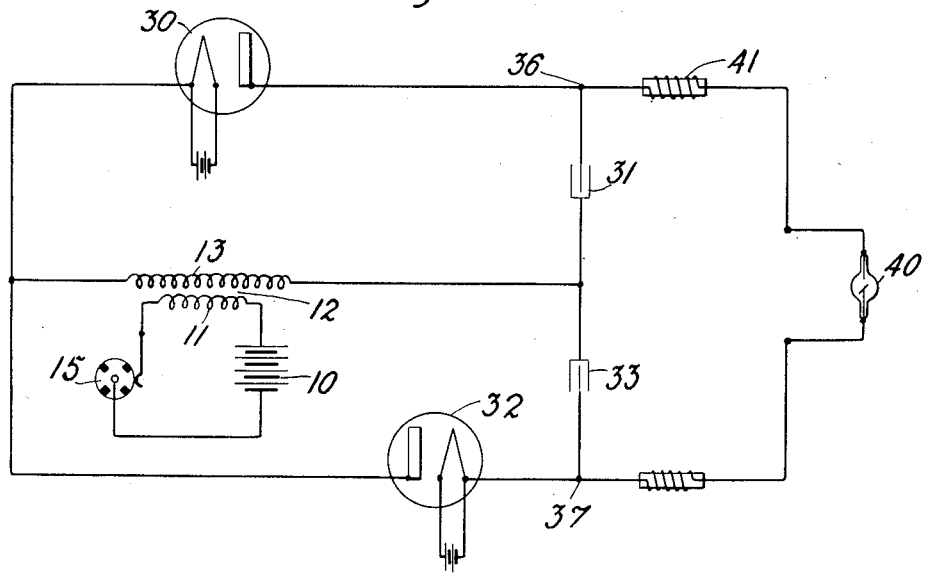

The invention will be better understood by reference to the following specification and accompanying drawing, in which Fig. 1 shows a circuit for transforming low voltage direct current to higher voltage direct current, and Fig. 2 shows a modification thereof by means of which an additional increase of output voltage is obtained.

Referring to Fig. 1, there is shown a source of direct current 10, such as a series of dry cells or any other desired source. This battery is connected to the primary 11 of the transformer 12, which transformer includes also the secondary 13. In series with the battery 10 and the primary 11 is placed an interrupter 15 of any suitable type. As stated above, the transformer 12 with the interrupter 15 may, if so desired, comprise the usual elements of an induction coil. 16 represents a rectifier of any suitable type, but there is here shown a thermionic rectifier which comprises the usual heated element 17 and the cold element 18. In case the element 17 is a filament, it will be necessary to supply some battery, such as 20, for heating the same. The secondary winding 13, the rectifier 16 and the condenser 22 are connected in series. Rigid across the condenser 22 is the load 23, and in general it is desirable to place in series with the load an impedance coil 24.

The operation of the device is as follows: Upon rotating the commutator or interrupter 15, a pulsatory or interrupted direct current flows through primary 11. There is then induced in the secondary 13, an alternating current voltage which is impressed upon the rectifier 16 and the condenser 22. Inasmuch as current can flow through the rectifier 16 in one direction only, that is, from the cold element 18 to hot element 17, it is apparent that current will flow through the circuit as a whole in one direction only, and the maximum voltage, which can be impressed upon the condenser 22 and the load 23, will be determined by the voltage induced in secondary 13. The condenser will, therefore, continue to receive a charge as long as its potential difference is less than the maximum voltage which is being developed in the transformer secondary. At the same time, the condenser will be delivering energy continuously to the load, and by proper choice of condenser capacity the voltage at which this energy is supplied will remain substantially constant.

As to the choice of capacity, it has been found that the output voltage is independent of the capacity of the condenser, i. e., remains constant, if the latter is larger than the minimum amount required to completely rectify, where by completely rectifying is meant the production of rectified voltage and current of constant or non-fluctuating value. It has also been found that the larger the current taken by the load, the larger is the capacity necessary to give a constant voltage and the smaller will be this constant voltage as obtained from a given source. This constancy of voltage when the condenser capacity is above a certain minimum value applies for any source and, therefore, affords a means for completely rectifying and stepping the voltage of any alternating current source.

When working under the conditions just stated, the voltage impressed upon, and the current supplied to, the load (assuming this to be fixed) will be constant. If, however, the circuit is operating very close to or somewhat below this condition, the fluctuations in the load circuit may be materially reduced by the use of an impedance or choke coil as shown at 24.

In general it is desirable that the number of turns in the secondary 13 shall be very large as compared with the number of turns in the primary 11, and by the use of a small induction coil, it has been possible, by means of a battery 10 of about six volts, to obtain a steady direct current in the output of about 100 volts, or again, an input voltage of 100 volts may be readily stepped up to an output direct current voltage of 2000. Other ratios of transformation may be obtained by suitable adjustment of the speed of rotation of the commutator 15 and of the transformer 12.

Figure 2 shows a modification in which the same input voltage as used in Figure 1 will give approximately double the output voltage. In this figure, 10 represents the input source of direct current, 11 and 13 represent the primary and secondary coils respectively of the transformer 12, and 15 shows an interrupter of the same type as shown in Figure 1. Connected to the secondary of the transformer 13 is a rectifier 30 and a condenser 31 in the same manner as shown in Figure 1. Connected to this secondary 13, there is also a rectifier 32 and capacity 33, the rectifier 32 being connected in parallel to but in the reverse direction to the rectifier 30. Upon starting the interrupter 15, alternating current voltages will be generated in the secondary 13. The impulses in the one direction will be able to pass through the rectifier 30 to charge the condenser 31, and the impulses in the opposite direction will be able to pass through the rectifier 32 to charge the condenser 33. In this way, there is obtained between the points 36 and 37, a potential difference equal to the sum of the potential differences to which the condensers 31 and 33 are charged. These condensers 31 and 33 then act as a source of steady current to a load or consumption circuit at 40. In order to reduce slight fluctuations in the output current, when drawing rather heavily from the condensers, it is desirable to insert in the circuits one or more choke coils, such as 41 and 42. The operation of the circuit shown in Figure 2 is the same as that in Figure 1, with the exception that the circuit is practically doubled and the output voltage thereby obtained will be equal to the sum of the voltages obtained from the two parts of the circuit separately.

What is claimed is:

1. A system for transforming direct current of low voltage to direct current of higher voltage comprising a low voltage source of direct current, an interrupter and a transformer primary winding in series therewith, a secondary winding coupled to said primary winding, two parallel circuits connected to the terminals of said secondary winding, each of said parallel circuits comprising a rectifier and a condenser in series, the rectifier in the one circuit being connected in the reverse direction to that in the other, the two condensers having one point in common, and a load circuit connected to the extreme terminals of the condensers.

2. A system for transforming low voltage direct current to higher voltage direct current comprising a low voltage source of unidirectional current, an interrupter, a transformer, the interrupter and the primary winding of said transformer being in series with said source, two parallel circuits connected to the terminals of the secondary winding of the transformer, each of said circuits comprising an asymmetrically conducting electron discharge device and a condenser in series, the discharge device in the one circuit being connected in the reverse direction to that in the other circuit, the two condensers having one point in common, and a load connected to the extreme terminals of the condensers whereby said condensers alternately act as a source of electromotive force in the load circuit so as to impress a substantially constant unidirectional E. M. F. thereon.

In witness whereof, I hereunto subscribe my name this 5th day of May, A. D. 1916.

HENDRIK J. VAN DER BIJL.